US009875548B2

United States Patent
Pavani et al.

(10) Patent No.: US 9,875,548 B2
(45) Date of Patent: Jan. 23, 2018

(54) CANDIDATE LIST GENERATION

(71) Applicants: Sri Kaushik Pavani, Chennai (IN); Anshul Garg, Haryana (IN); Bharathi Shekar, Bangalore (IN)

(72) Inventors: Sri Kaushik Pavani, Chennai (IN); Anshul Garg, Haryana (IN); Bharathi Shekar, Bangalore (IN)

(73) Assignee: Ricoh Co., Ltd., Tokyo (JP)

( * ) Notice: Subject to any disclaimer, the term of this patent is extended or adjusted under 35 U.S.C. 154(b) by 208 days.

(21) Appl. No.: 14/975,658

(22) Filed: Dec. 18, 2015

(65) Prior Publication Data
US 2017/0178335 A1  Jun. 22, 2017

(51) Int. Cl.
*G06T 7/00* (2017.01)
*G06T 1/00* (2006.01)

(52) U.S. Cl.
CPC .......... *G06T 7/0081* (2013.01); *G06T 1/0007* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,383,111 A * | 1/1995 | Homma | ............... | G06Q 10/087 235/385 |
| 6,005,987 A * | 12/1999 | Nakamura | ............ | G06T 3/4038 348/42 |
| 6,269,174 B1 * | 7/2001 | Koba | ...................... | H04N 19/51 348/154 |
| 6,549,681 B1 * | 4/2003 | Takiguchi | ............. | G06T 3/4038 358/450 |
| 6,738,530 B1 * | 5/2004 | Kamitani | ............ | G06K 9/3283 382/289 |
| 7,953,299 B2 | 5/2011 | Shiiyama | | |
| 8,189,855 B2 * | 5/2012 | Opalach | ................... | G06K 9/00 382/100 |

(Continued)

FOREIGN PATENT DOCUMENTS

WO   WO2015086537   6/2015

OTHER PUBLICATIONS

Kwatra, Vivek et al.; "Graphcut Textures: Image and Video Synthesis Using Graph Cuts"; found at http://www.cc.gatech.edu/cpl/projects/graphcuttextures; dated 2003; 10 pages; GVU Center / College of Computing Georgia Institute of Technology.
F. Pitie, et al.; "N-Dimensional Probability Density Function Transfer and its Application to Colour Transfer"; dated 2005; 6 pages; University of Dublin, trinity College Dublin 2, Ireland.
Matthew Brown and David G. Lowe "Automatic Panoramic Image Stitching Using Invariant Features"; dated Dec. 2006; 15 pages; International Journal of Computer Vision 74(1).
Francois Pitie, et al.; "Automated Colour Grading Using Colour Distribution Transfer"; dated 2007; 15 pages; Trinity College Dublin, 2 College Green, Dublin, Ireland.

(Continued)

*Primary Examiner* — Anand Bhatnagar
(74) *Attorney, Agent, or Firm* — Patent Law Works LLP (57) ABSTRACT

A system and method that generates a candidate list of indexed images that potentially match an object in a query image is disclosed. The method includes receiving a query image including an object, receiving a plurality of indexed images that match the object, computing a region of interest for the object, computing an overlap between a first region of interest corresponding to a first indexed image and a second region of interest corresponding to a second indexed image, determining that the overlap between the first region of interest and the second region of interest satisfies a threshold and including the first indexed image and the second indexed image in a candidate list of indexed images.

20 Claims, 9 Drawing Sheets

(56) References Cited

U.S. PATENT DOCUMENTS

| | | | |
|---|---|---|---|
| 9,311,533 B2* | 4/2016 | Huynh-Thu | G06K 9/00711 |
| 9,406,133 B2* | 8/2016 | Yang | G06T 7/0038 |
| 9,443,164 B2* | 9/2016 | Sulc | G06T 7/73 |
| 9,508,151 B2* | 11/2016 | Romanik | G06T 7/73 |
| 2003/0083850 A1 | 5/2003 | Schmidt et al. | |
| 2005/0286759 A1* | 12/2005 | Zitnick, III | G06T 15/205 |
| | | | 382/154 |
| 2006/0013463 A1 | 1/2006 | Ramsay et al. | |
| 2008/0089615 A1 | 4/2008 | Shiiyama | |
| 2008/0232698 A1* | 9/2008 | Shi | G06K 9/00228 |
| | | | 382/225 |
| 2009/0185717 A1* | 7/2009 | Watanabe | G06K 9/6203 |
| | | | 382/103 |
| 2012/0243737 A1 | 9/2012 | Ogawa | |
| 2016/0110902 A1* | 4/2016 | Chirakansakcharoen | |
| | | | G01G 19/4144 |
| | | | 345/633 |
| 2016/0155011 A1* | 6/2016 | Sulc | G06T 7/73 |
| | | | 382/103 |

OTHER PUBLICATIONS

F. Pitie, A. Kokaram "The Linear Monge-Kantorovitch Linear Colour Mapping for Example-Based Colour Transfer"; dated 2007; 9 pages; sigmedia.tv, Trinity College Dublin, Ireland.

Jorge Moraleda and Jonathan J. Hull; "Toward Massive Scalability in Image Matching"; dated 2010; 4 pages; 2010 International Conference on Pattern Recognition.

Mazin, Baptiste, et al. "Combining Color and Geometry for Local Image Matching" dated Nov. 11-15, 2012; 4 pages; 21st International Conference on Pattern Recognition (ICPR 2012), Tsukuba, Japan.

Nicolas Bonneel, et al. "Example-Based Video Color Grading" dated 2013; 11 pages.

Gormish, Michael; "Stitching Software for Ocutag Retail Execution (ORE)", dated Oct. 12, 2015; 15 pages.

Ramya Narasimha, et al. "Colour-Based Post-Processing of RVS Image Matching Results for ORE Product Disambiguation" dated Oct. 21, 2015, 18 pages.

* cited by examiner

CANDIDATE LIST GENERATION

BACKGROUND

Field of the Invention

The specification generally relates to generating a candidate list of indexed images. In particular, the specification relates to a system and method for generating a candidate list of indexed images that includes indexed images matching an object in the query image.

Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity and sizes of an item are placed to optimize profits or other parameters. However, presentation and maintenance of adequate levels of stock on shelves, racks, and display stands is a labor-intensive effort, thereby making enforcement of planograms difficult. While the location and quantity of products in retail stores can be manually tracked by a user, attempts are being made to automatically recognize the products using computers. However, current methods for computer identification of products in a query image is not perfect and multiple different identifications for a product may be returned. Therefore, there remains a need for generating and organizing a candidate list of recognition results which can be used for further processing and can reduce the time for a human to search a database containing multiple matches of the query image.

SUMMARY

The techniques introduced herein overcome the deficiencies and limitations of the prior art, at least in part, with a system and method for generating a candidate list of indexed images that potentially match an object in a query image. In one embodiment, the system includes an image recognition application. The image recognition application is configured to receive a query image including an object. The image recognition application is further configured to receive a plurality of indexed images that match the object. The image recognition application is further configured to compute a region of interest for the object. The image recognition application is further configured to compute an overlap between a first region of interest corresponding to a first indexed image and a second region of interest corresponding to a second indexed image. The image recognition application is further configured to determine that the overlap between the first region of interest and the second region of interest satisfies a threshold. The image recognition application is further configured to include the first indexed image and the second indexed image in a candidate list of indexed images in response to the overlap satisfying the threshold.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
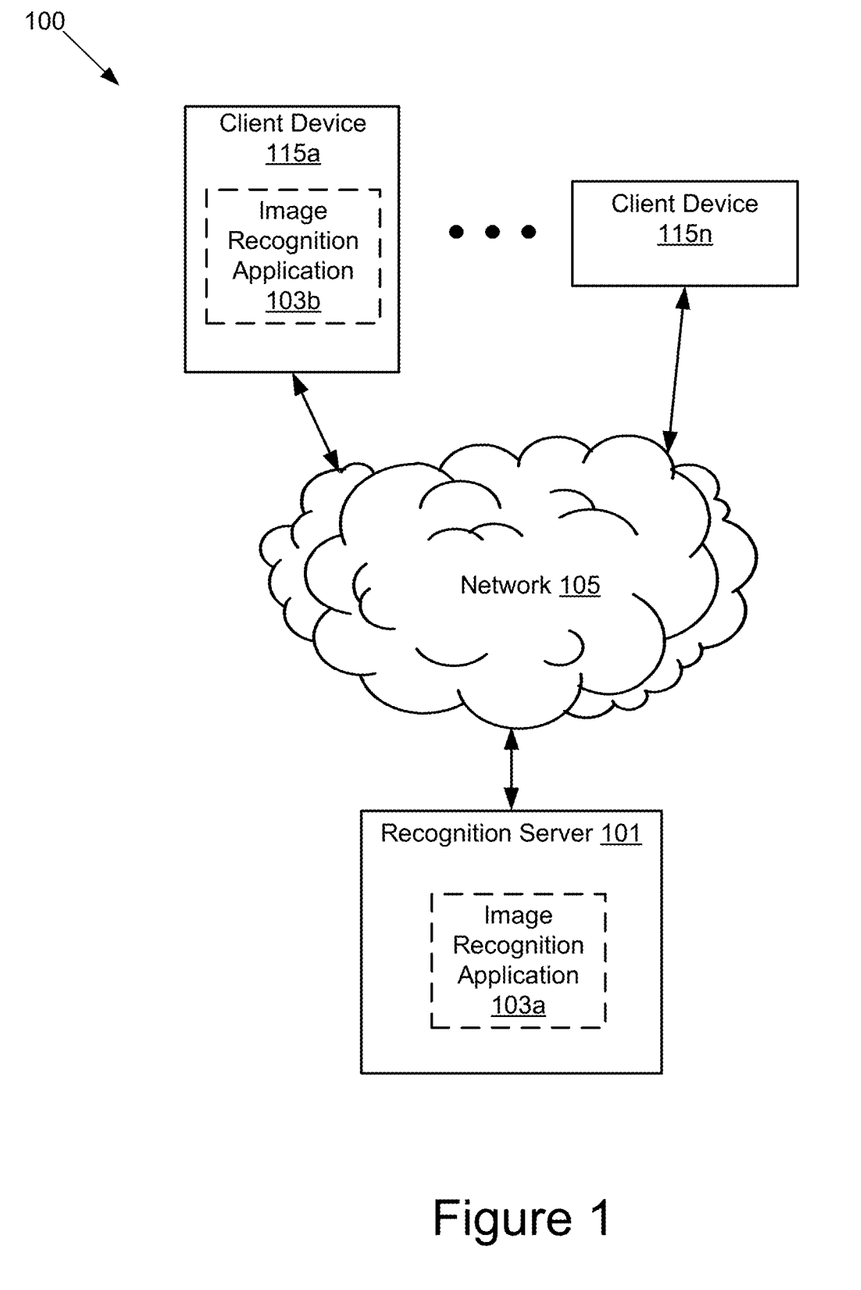
FIG. 1 is a high-level block diagram illustrating one embodiment of an image recognition system.

FIG. 1 is a high-level block diagram illustrating one embodiment of an image recognition system 100. The illustrated system 100 may have one or more client devices 115*a* . . . 115*n* that can be accessed by users and a recognition server 101. In FIG. 1 and the remaining figures, a letter after a reference number, e.g., "115*a*," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. In some embodiments, the recognition server 101 may be either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images to and from the client device 115. The images may include an image of a product on a shelf of a retail display. The images received by the recognition server 101 can include an image captured by the client device 115, an image copied from a website or an email, or an image from any other source. In another example, the recognition server 101 sends a request for datasets and receives datasets from a plurality of third-party servers (not shown). Although only a single recognition server 101 is shown in FIG. 1, it should be understood that there may be any number of recognition servers 101 or a server cluster.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. For example, the client device 115 may include a graphics processor unit (GPU) for handling graphics and multimedia processing. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends an input image to the recognition server 101 and the recognition server 101 provides data in JavaScript Object Notation (JSON) format about a quality score for the input image to the client device 115. The client device 115 may support use of graphical application program interface (API) such as Metal on Apple iOS™ or RenderScript on Android™ for determination of feature location and feature descriptors during image processing.

The image recognition application 103 may include software and/or logic to provide the functionality for generating a candidate list of recognition results. In some embodiments, the image recognition application 103b may be a thin-client application with some functionality executed on the client device 115 and additional functionality executed on the recognition server 101 by image recognition application 103a. For example, the image recognition application 103b on the client device 115 could include software and/or logic for capturing an image, transmitting the image to the recognition server 101, and displaying a candidate list of recognition results. In another example, the image recognition application 103a on the recognition server 101 could include software and/or logic for receiving the image, stitching the image into a larger composite image based on sufficient overlap with a previously received image and generating a candidate list for a product in the stitched image. In yet another example, the image recognition application 103a on the recognition server 101 could include software and/or logic for generating a list of recognition results for a product in the input image. The image recognition application 103a or 103b may include further functionality described herein, such as, processing the image and performing feature identification.

In some embodiments, the image recognition application 103 receives a query image. The image recognition application 103 identifies features in the query image and identifies a product in the image based on the features in the query image. For example, the image recognition application 103 identifies the product by matching features in the query image to a plurality of indexed images. The image recognition application 103 computes an area match for the plurality of indexed images. The image recognition application 103 computes an overlap between a first region of interest in the query image corresponding to features matching a first indexed image and a second region of interest in the query image corresponding to features matching a second indexed image. The image recognition application 103 determines that the overlap between the first region of interest and the second region of interest satisfies a threshold. The image recognition application 103 includes the first indexed image and the second indexed image in a candidate list of indexed images. While the examples herein describe that the list of recognition results for a product in the input image may be sorted based on the area match, it should be understood that the list of recognition results may be sorted based on any other confidence measure. For example, the list of recognition results for a product in the input image may be sorted based on luminance features of the product, or the like. The operation of the image recognition application 103 and the functions listed above are described below in more detail below with reference to FIGS. 3-5.

Figure 2:
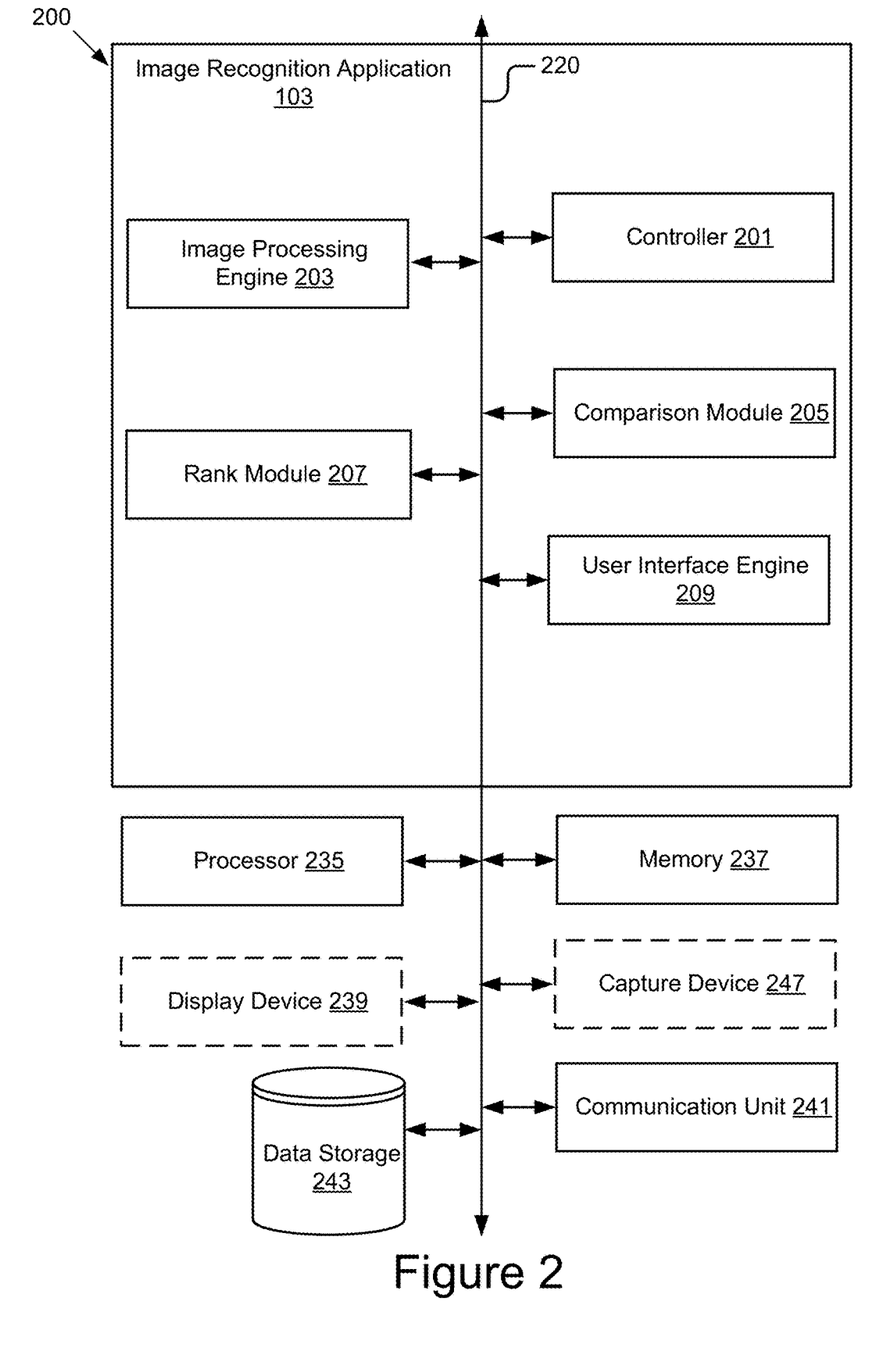
FIG. 2 is a block diagram illustrating one embodiment of a computing device including an image recognition application.

FIG. 2 is a block diagram illustrating one embodiment of a computing device 200 including an image recognition application 103. The computing device 200 may also include a processor 235, a memory 237, an optional display device 239, a communication unit 241, data storage 243, and an optional capture device 247 according to some examples. The components of the computing device 200 are communicatively coupled by a bus or software communication mechanism 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the client device 115, the recognition server 101, or a combination of the client device 115 and the recognition server 101. In such embodiments where the computing device 200 is the client device 115 or the recognition server 101, it should be understood that the client device 115 and the recognition server 101 may include other components described herein but not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the optional display device 239, the communication unit 241, the image recognition application 103, the data storage 243, and the optional capture device 247. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the image recognition application 103. The memory 37 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 may be a liquid crystal display (LCD), light emitting diode (LED) or any other similarly equipped display device, screen or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2 with dashed lines to indicate it is optional. For example, where the computing device 200 is the recognition server 101, the display device 239 is not part of the system, and where the computing device 200 is the client device 115, the display device 239 is included and is used to display images and a candidate list of indexed images.

The communication unit 241 is hardware and/or software for receiving and transmitting data by linking the processor 235 to the network 105 and other processing systems. The communication unit 241 receives data such as requests from the client device 115 and transmits the requests to the controller 201, for example a request to process a query image. The communication unit 241 also transmits information including recognition results that match a product in the query image to the client device 115 for display, for example, in response to processing the query image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 may store data for analyzing a received query image and results of the analysis and other functionality as described herein. For example, the data storage 243 may store templates for a plurality of stock keeping units for image recognition purposes. A stock keeping unit (SKU) is a distinct item, such as a product offered for sale. The stock keeping unit includes all attributes that makes the item distinguishable as a distinct product from all other items. For example, the attributes include product identifier (Universal Product Code), product name, dimensions (width, height, depth, etc.), size (liters, gallons, ounces, pounds, kilograms, fluid ounces, etc.), description, brand manufacturer, color, packaging, material, model number, price, discount, base image, etc. The stock keeping unit may also refer to a unique identifier that refers to the particular product or service in the inventory. In some embodiments, the data storage 243 stores a query image and the set of features determined for the query image. The data storage 243 may similarly store a plurality of recognition results determined for the one or more received query images. Additionally, the data storage 243 may store datasets used in determining area match scores for the indexed images. The data stored in the data storage 243 is described below in more detail.

The capture device 247 may be operable to capture an image or data digitally of an object of interest. For example, the capture device 247 may be a high definition (HD) camera, a regular 2D camera, a multi-spectral camera, a structured light 3D camera, a time-of-flight 3D camera, a stereo camera, a standard smartphone camera or a wearable computing device. The capture device 247 is coupled to the bus to provide the images and other processed metadata to the processor 235, the memory 237 or the data storage 243. It should be noted that the capture device 247 is shown in FIG. 2 with dashed lines to indicate it is optional. For example, where the computing device 200 is the recognition server 101, the capture device 247 is not part of the system, and where the computing device 200 is the client device 115, the capture device 247 is included and is used to provide images and other metadata information described below with reference to FIGS. 3-5.

In some embodiments, the image recognition application 103 may include a controller 201, an image processor 203, a comparison module 205, a rank module 207 and a user interface engine 209. The components of the image recognition application 103 are communicatively coupled via the bus or software communication mechanism 220. The components of the image recognition application 103 can be implemented using programmable or specialized hardware including a field-programmable gate array (FPGA) or an application-specific integrated circuit (ASIC). In some embodiments, the components of the image recognition application 103 can be implemented using a combination of hardware and software executable by processor 235. In some embodiments, the components of the image recognition application 103 are a set of instructions executable by the processor 235. In some implementations, the components of the image recognition application 103 are stored in the memory 237 and are accessible and executable by the processor 235. In some implementations, the components of the image recognition application 103 are adapted for cooperation and communication with the processor 235, the memory 237 and other components of the image recognition application 103 via the bus or software communication mechanism 220.

The controller 201 may include software and/or logic to control the operation of the other components of the image recognition application 103. The controller 201 controls the other components of the image recognition application 103 to perform the methods described below with reference to FIGS. 5A and 5B. The controller 201 may also include software and/or logic to provide the functionality for handling communications between the image recognition application 103 and other components of the computing device 200 as well as between the components of the image recognition application 103.

In some embodiments, the controller 201 sends and receives data, via the communication unit 241, to and from one or more of the client device 115 and the recognition server 101. For example, the controller 201 receives, via the communication unit 241, a query image from a client device 115 operated by a user and sends the query image to the image processor 203. In another example, the controller 201 receives data for providing a graphical user interface to a user from the user interface engine 209 and sends the data to a client device 115, causing the client device 115 to present the user interface to the user.

In some embodiments, the controller 201 receives data from other components of the image recognition application 103 and stores the data in the data storage 243. For example, the controller 201 receives data including features identified for a query image from the image processor 203 and stores the data in the data storage 243. In other embodiments, the controller 201 retrieves data from the data storage 243 and sends the data to other components of the image recognition application 103. For example, the controller 201 retrieves data including a threshold overlap area for an indexed image from the data storage 243 and sends the retrieved data to the comparison module 205.

In some embodiments, the communications between the image recognition application 103 and other components of the computing device 200 as well as between the components of the image recognition application 103 can occur independent of the controller 201.

The image processing engine 203 may include software and/or logic to provide the functionality for receiving and processing one or more query images including one or more products from the client device 115. In some embodiments, the image processing engine 203 receives one or more query images of a shelving unit from the client device 115. For example, the query image can be an image of packaged products on a shelving unit (e.g., coffee packages, breakfast cereal boxes, soda bottles, etc.) which includes products on the shelves in a retail store.

In some embodiments, the image processing engine 203 may process the one or more images serially or in parallel. The image processing engine 203 determines a set of features for the received query image. For example, the image processing engine 203 may determine a location, an orientation, an area match, a region of interest, and an image descriptor for each feature identified in the received image. In some embodiments, the image processing engine 203 uses corner detection algorithms for determining feature location. For example, the corner detection algorithms can include Shi-Tomasi corner detection algorithm, Harris and Stephens corner detection algorithm, etc. In some embodiments, the image processing engine 203 uses feature description algorithms for determining efficient image feature descriptors. For example, the features description algorithms may include Binary Robust Independent Elementary Features (BRIEF), Scale-Invariant Feature Transform (SIFT), Speeded Up Robust Features (SURF), etc.

The image processing engine 203 compares the features of the received query image with the features of indexed images stored for a plurality of objects in the data storage 243 for image recognition. The image processing engine 203 determines a match between features in the query image and features of an indexed image based on the comparison and returns the matched objects and information associated with the matched objects as a recognition result. In some embodiments, the returned information may include a list of object attributes, a spatial location of an object in the received query image, an area match for the received query image, and a region of interest (ROI) associated with the object. In some embodiments, a region of interest estimates the perimeter of an object in the image and provides an estimation for the position and dimension of the object. For example, the image recognition module 203 may use x-y coordinates on a two-dimensional plane to describe the spatial location of an object and the boundaries of the object (e.g., ROI). A region of interest can be of any shape, for example, a polygon, a circle with a center point and a diameter, a rectangular shape of a width, a height and one or more reference points for the region (e.g., a center point, one or more corner points for the region), etc. For example, the region of interest may border the matched object in its entirety. In another example, the region of interest may border the exposed labeling containing pictorial and textual information associated with the matched object.

In some embodiments, the image processing engine 203 instructs the user interface engine 209 to generate a graphical user interface that depicts an interactive graphical geometric shape superimposed on the received query image. Each graphical geometric shape corresponds to a ROI of an object. For example, the image processing engine 203 instructs the user interface engine 209 to generate an interactive rectangle to be superimposed on a region depicted in the image on the display of the client device 115 to indicate boundaries of a breakfast cereal box. Other examples of interactive graphical geometric shape may include a polygon, a circle, an ellipse, etc. In some embodiments, the image processing engine 203 stores the objects identified from an input image and their corresponding information in the data storage 243.

In some embodiments, the image processing engine 203 retrieves a plurality of indexed images matching an identified object from the data storage 243. The image processing engine 203 determines an area match for each recognition result. An area match is a ratio of a convex hull of matching inlier points to the area of product boundary (e.g., an area of interest for the recognition result). The area match may be used to rank how closely an indexed image matches features of the identified object in the query image.

Figure 3A:
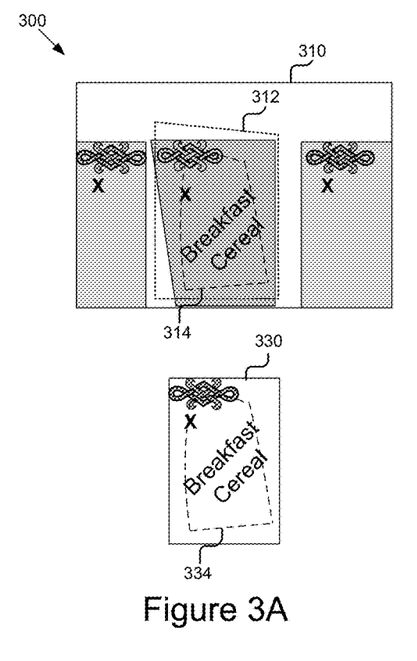
FIGS. 3A-3D are graphical representations illustrating one embodiment of computing region of interest and area match for a query image and an indexed image.

FIGS. 3A-3D are graphical representations illustrating one embodiment of computing region of interest and area match for a query image based on a recognition result. In the example of FIG. 3A, image 310 is a query image received by the image recognition application 103. Image 330 is an indexed image returned as a recognition result for an object in the query image 310. The image processing engine 203 calculates the region of interest 312 and a convex hull of matching inlier points 314 for an object identified in the query image 310. The image processing engine 203 retrieves recognition result including an indexed image 330 from the data storage 243. The matching inlier points 334 are depicted on the indexed image 330 in the example of FIG. 3A to illustrate the matching features between the object in the query image 310 and the indexed image 330. The image processing engine 203 determines an area match for the recognition result using the region of interest 312 and the convex hull of matching inlier points 314. As described above, the area match may be used to rank recognition results. For example, by performing an area match on image 310, the image processing engine 203 determines that the indexed image 330 as the most accurate match for query image 310 since it has the highest area match of the returned recognition results.

Figure 3B:
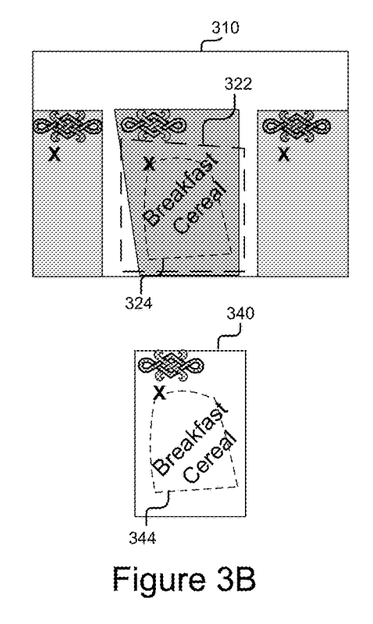

In the example of FIG. 3B, the query image 310 is depicted with a different identified region of interest 322 and convex hull of matching inlier points 324. In this example, the image processing engine 203 calculates a different region of interest 322 and a different convex hull of matching inlier points 344 for the object identified in the query image based on a different recognition result than in the example of FIG. 3A. The corresponding indexed image for the recognition result in the example of FIG. 3B is depicted as image 340. The image processing engine 203 retrieves the indexed image 340 from the data storage 243 and generates the region of interest 322 and the convex hull of matching inlier points 324. As can be seen from the example of FIGS. 3A and 3B, the convex hull of matching inlier points and the region of interest may differ for each pair of query image and indexed image.

Figure 3C:
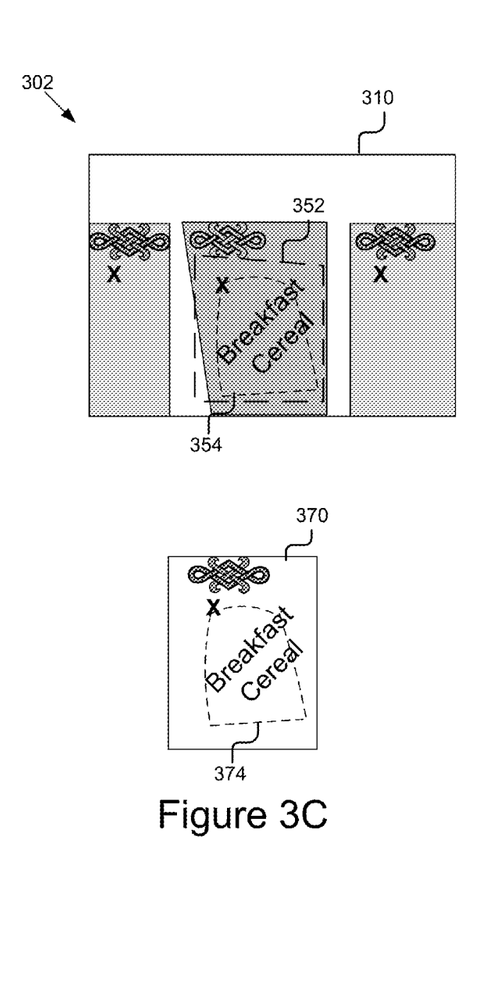
Figure 3D:
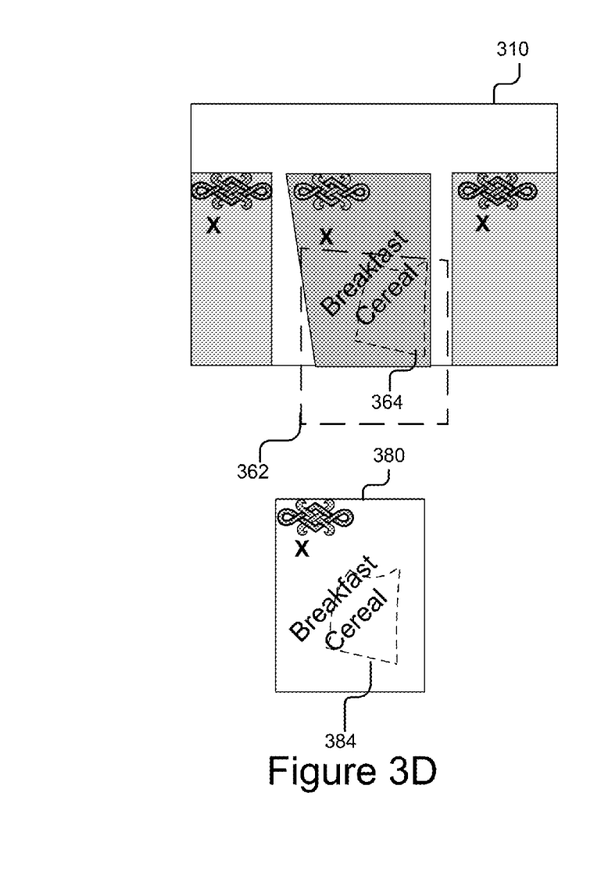

Referring now to FIG. 3C, the image processing engine 203 calculates a region of interest 352 and a convex hull of matching inlier points 354 for a third recognition result of the object identified in the query image 310. The convex hull of matching inlier points 374 are depicted on the corresponding indexed image 370. Similarly, as depicted in the example of FIG. 3D, the image processing engine 203 calculates a region of interest 362 and a convex hull of matching inlier points 364 for a fourth recognition result of the object identified in the query image 310. The convex hull of matching inlier points 384 are depicted on the corresponding indexed image 380.

As described above, in some embodiments the image processing engine 203 calculates an area match score for the indexed images. The image processing engine 203 identifies an object in a query image and retrieves one or more indexed images that match the identified object. In some embodiments, the image processing engine 203 may only return a recognition result if the area match score satisfies a threshold. In the example of FIGS. 3A-3D, the area match score for indexed image 310 is calculated as the ratio of the convex hull of matching inlier points 314 and the region of interest 312 for a matching object in the indexed image 310. In some embodiments, the image processing engine 203 sends the data including area match score to the rank module 207 and receives sorted list of recognition results from the rank module 207. The recognition results may be sorted based on the area match score. In other embodiments, the image processing engine 203 stores the area match score in the data storage 243.

The comparison module 205 may include software and/or logic to compare an overlap between regions of interest for recognition results. In some embodiments, the comparison module 205 receives a list of recognition results from the rank module 207. The list of recognition results may include matching features, a region of interest, and/or an area match score. In some embodiments, the list of recognition results may be sorted based on the area match score. For example, the first result in the list of recognition results has the highest area match score and is considered to be the most accurate match and so on. In other embodiments, the list of recognition results may be sorted based on other features of the indexed images.

In some embodiments, the comparison module 205 computes an overlap between a region of interest corresponding to the first recognition result in the list of recognition results and a region of interest corresponding to the second recognition result in the list of recognition results. The comparison module determines if the overlap satisfies a threshold. This process is described in more detail below with reference to FIGS. 4A-4C.

Figure 4A:
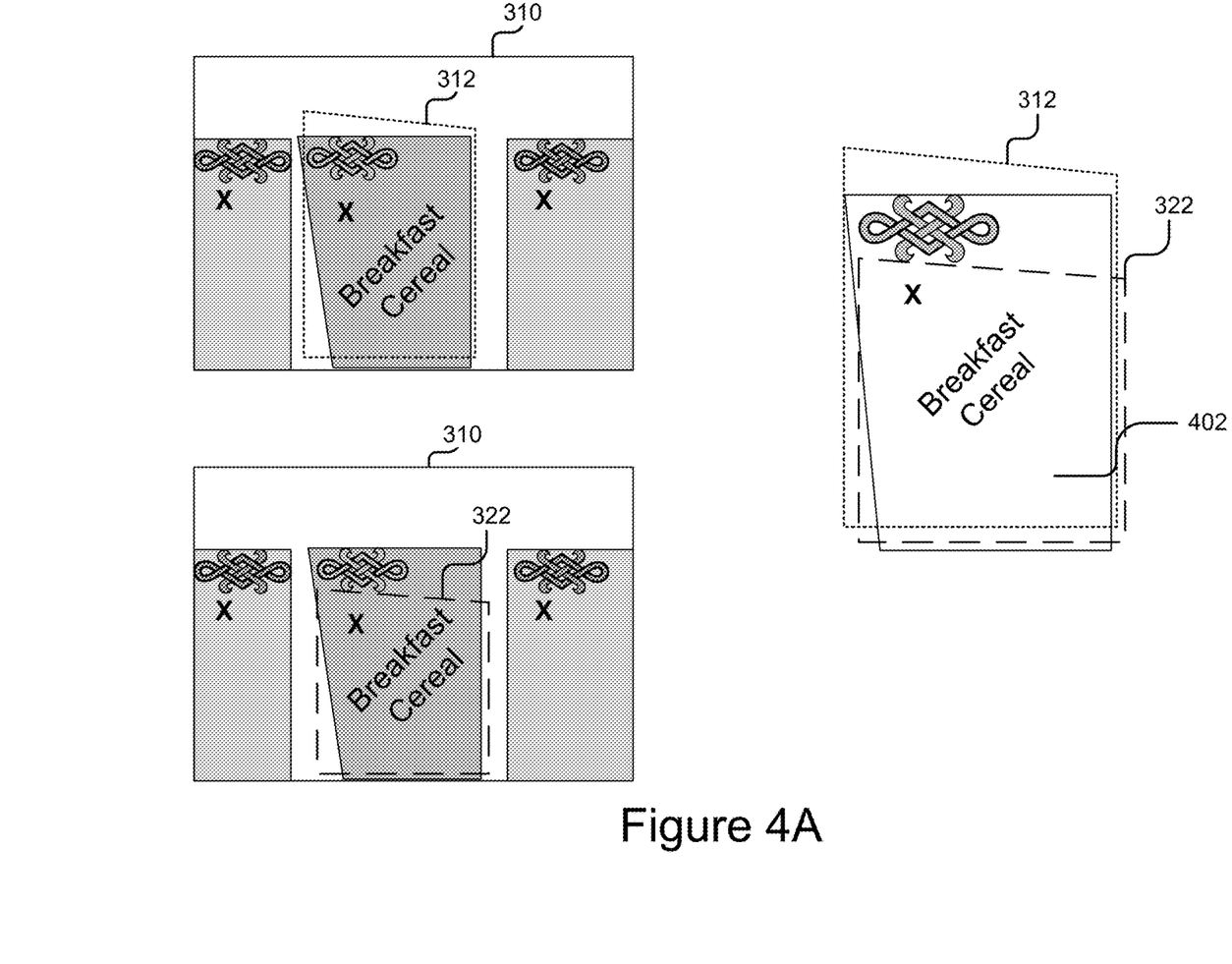
FIGS. 4A-4C are graphical representations illustrating one embodiment of computing an overlap between regions of interest corresponding to indexed images.

FIGS. 4A-4C are graphical representations illustrating one embodiment of computing an overlap between regions of interest corresponding to recognition results. In the example of FIG. 4A, the comparison module 205 computes an overlap between the region of interest 312 corresponding to the first recognition result of the object in the query image 310 and the region of interest 322 corresponding to the second recognition result of the object in the query image 310. The comparison module 205 computes the overlap area 402 between the regions of interest corresponding to the first and second recognition results.

Figure 4B:
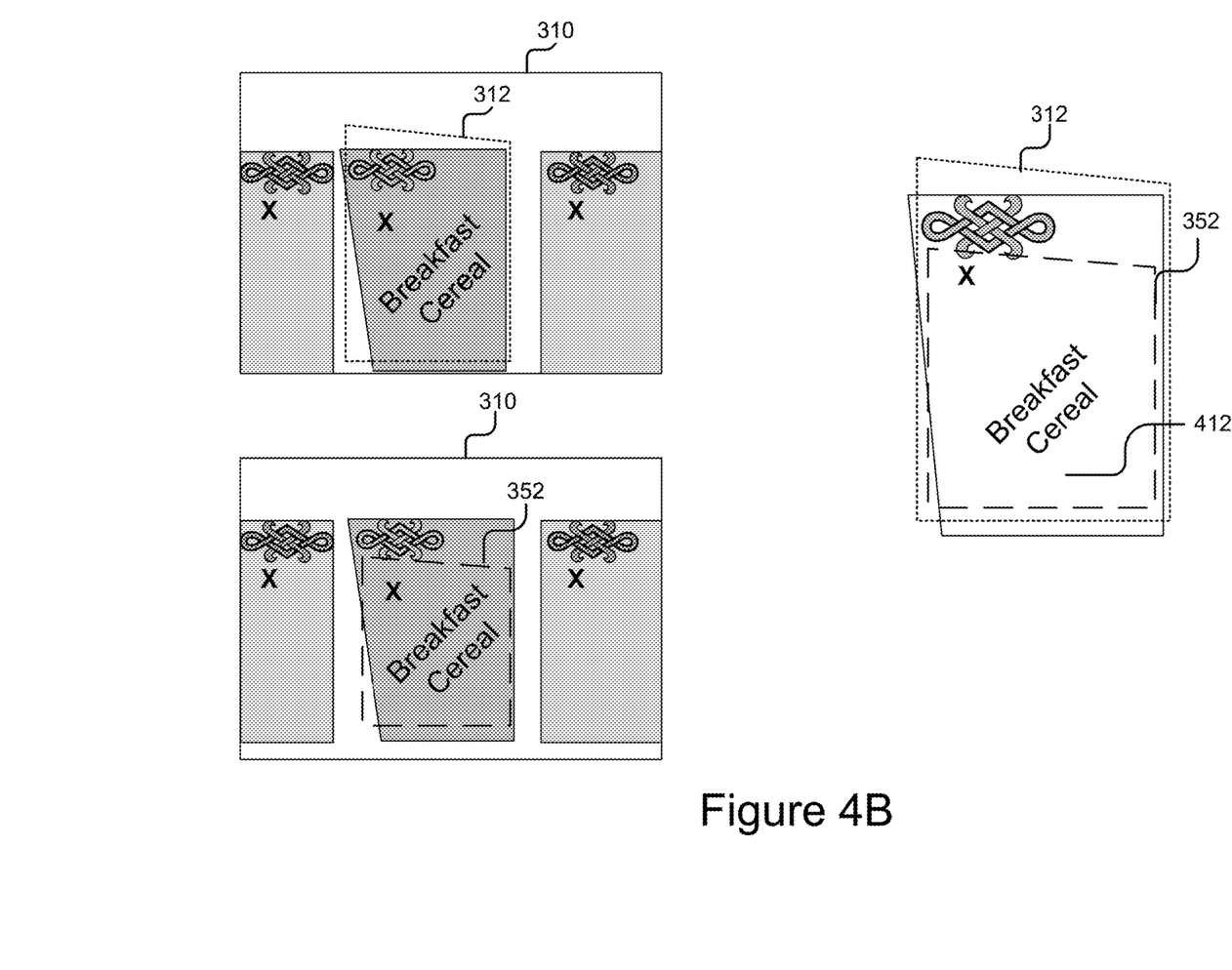

Referring now to FIG. 4B, the comparison module 205 computes an overlap between the region of interest 312 corresponding to the first recognition result of the object in the query image 310 and the region of interest 352 corresponding to the third recognition result of the object in the query image 310. The comparison module 205 computes the overlap area 412 between the regions of interest corresponding to the first and third recognition results.

Figure 4C:
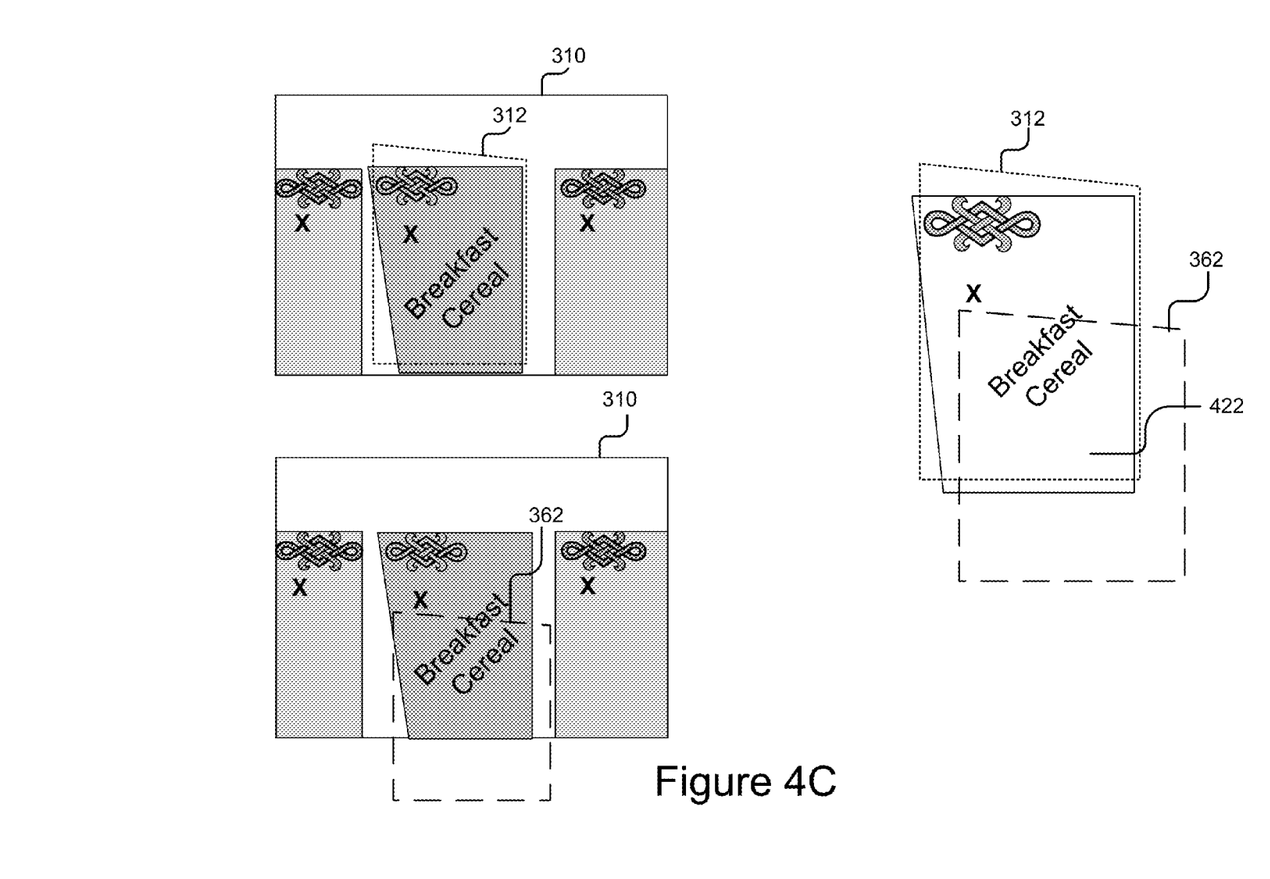

Referring now to FIG. 4C, the comparison module 205 computes an overlap between the region of interest 312 corresponding to the first recognition result of the object in the query image 310 and the region of interest 362 corresponding to the fourth recognition result of the object in the query image 310. The comparison module 205 computes the overlap area 422 between the regions of interest corresponding to the first and fourth recognition results.

In some embodiments, the comparison module 205 determines whether the overlap area between the regions of interest corresponding to the pair of recognition results satisfies a threshold. For example, the threshold may be an overlap area of 60%. As depicted in the example of FIG. 4C, the overlap area 422 may not satisfy the threshold. As a result, the fourth recognition result may be excluded from the candidate list of indexed images.

The rank module 207 generates a candidate list of indexed images. In some embodiments, the candidate list of indexed images may be ordered according to increasing overlap scores. In other embodiments, candidate list of indexed images may be ordered based on corresponding area match scores. In other embodiments, the rank module 207 stores the list of recognition results and the candidate list of indexed images in the data storage 243.

The user interface engine 209 may include software and/or logic for providing user interfaces to a user. In some embodiments, the user interface engine 209 receives instructions from the rank module 207 to generate a graphical user interface of the candidate list of indexed images on the display of the client device 115. In some embodiments, the user interface engine 209 receives instructions from the rank module 207 to generate a graphical user interface that displays the list of recognition results. In other embodiments, the user interface engine 209 sends graphical user interface data to an application (e.g., a browser) in the client device 115 via the communication unit 241 causing the application to display the data as a graphical user interface.

Figure 5A:
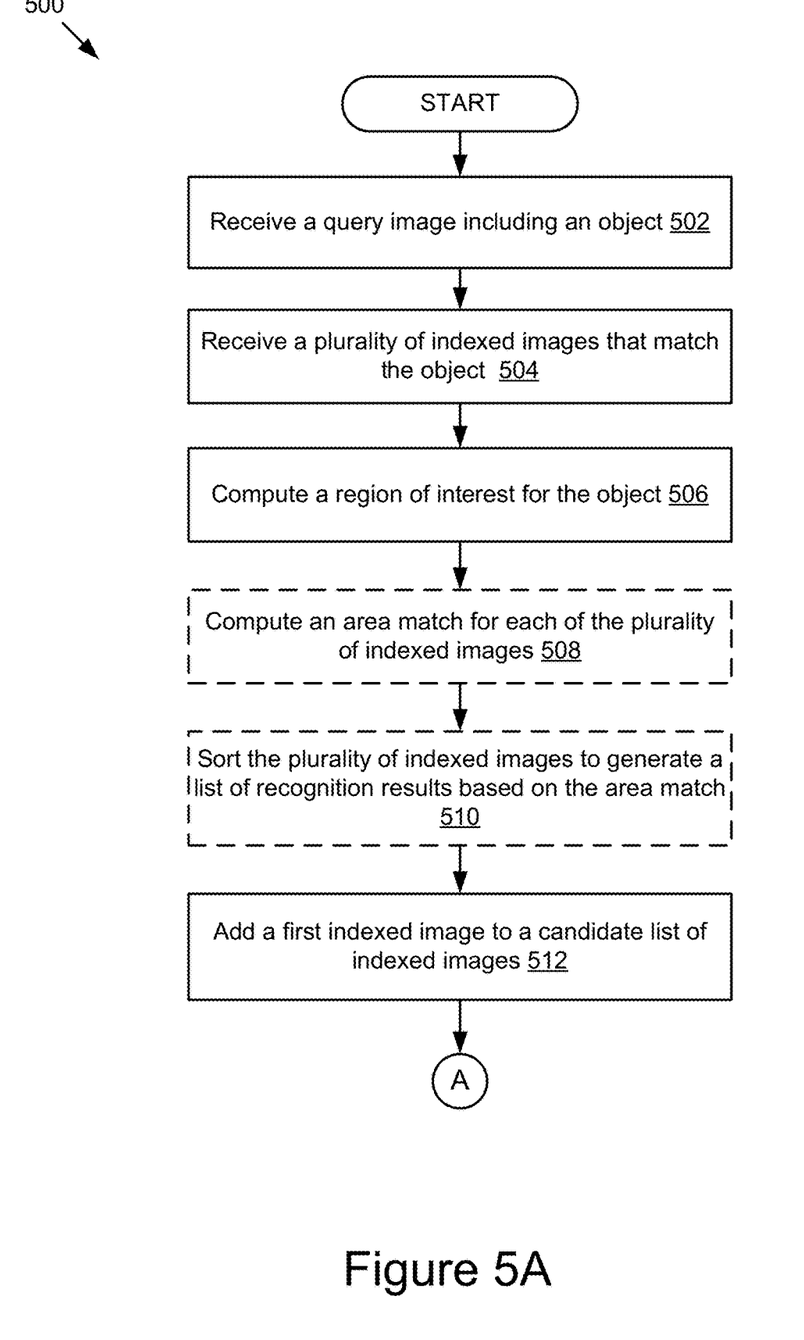
FIGS. 5A and 5B are example flow diagrams illustrating one embodiment of a method for generating a candidate list of indexed images.

FIGS. 5A and 5B are an example flow diagram illustrating one embodiment of a method 500 for generating a candidate list of indexed images. At 502, the image processing engine 203 receives a query image including an object. The query image may be captured using a camera at a client device 115. At 504, the image processing engine 203 receives a plurality of indexed images that match the object. At 506, the image processing engine 203 computes a region of interest for the object. For example, the image processing engine 203 may determine features of the query image and identify a region of interest for the object in the query image. At 508, the image processing engine 203 may optionally compute an area match for each of the plurality of indexed images. For example, the image processing engine 203 computes the area match as the ratio between the convex hull of matching inlier points of the indexed image to the region of interest. At 510, the rank module 207 sorts the plurality of indexed images to generate a list of recognition results based on the area match. At 512, the rank module 207 adds a first indexed image to a candidate list of indexed images. In some embodiments, the first indexed image is the most accurate match of the query image and has the maximum area match score.

Figure 5B:
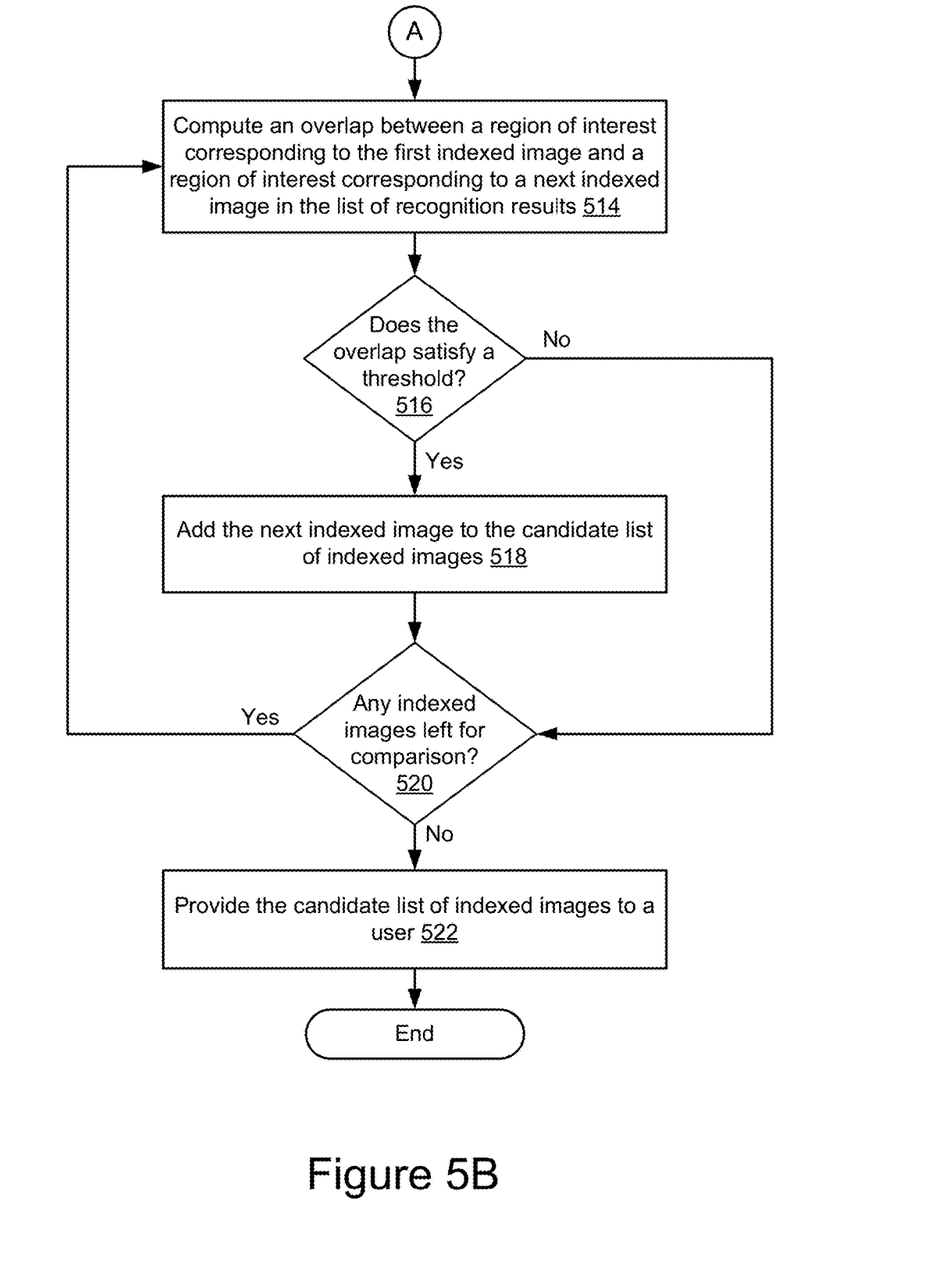

Referring now to FIG. 5B, at 514, the comparison module 205 computes an overlap between a region of interest corresponding to the first indexed image and a region of interest corresponding to a next indexed image in the list of recognition results. For example, the comparison module 205 computes an overlap between the region of interest corresponding to the first indexed image in the list of recognition results and the region of interest corresponding to the second indexed image in the list of recognition results. At 516, the comparison module 205 determines if the overlap satisfies a threshold. At 518, in response to determining that the overlap satisfies a threshold, the rank module 207 adds the next indexed image to the candidate list of indexed images. In response to determining that the overlap does not satisfies the threshold, at 520, the comparison module 205 determines if there are any indexed images left in the list of recognition results for comparison. In response to determining that there are indexed images left in the list of recognition results, the comparison module 205 computes an overlap between the first indexed image in the list of recognition results and the next remaining indexed image in the list of recognition results. At 522, in response to determining that there are no indexed images left in the list of recognition results, the user interface engine 522 provides the candidate list of indexed images to a user.

A system and method for generating a candidate list of indexed images has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving, by one or more processors, a query image including an object;
receiving, by the one or more processors, a plurality of indexed images that match the object;
computing, by the one or more processors, a region of interest for the object;
computing, by the one or more processors, an overlap between a first region of interest corresponding to a first indexed image and a second region of interest corresponding to a second indexed image;
determining, by the one or more processors, that the overlap between the first region of interest and the second region of interest satisfies a threshold; and
including, by the one or more processors, the first indexed image and the second indexed image in a candidate list of indexed images.

2. The computer-implemented method of claim 1, further comprising:
computing an area match for each of the plurality of indexed images; and
sorting the plurality of indexed images to generate a list of recognition results based on the area match.

3. The computer-implemented method of claim 2, wherein the list of recognition results includes the first indexed image and the second indexed image.

4. The computer-implemented method of claim 2, wherein the area match for an indexed image is a ratio of a convex hull of matching inlier points included in the indexed image and a corresponding region of interest.

5. The computer-implemented method of claim 2, further comprising:
computing an overlap between the region of interest corresponding to the first indexed image and a region of interest corresponding to a next remaining indexed image in the list of recognition results;
determining that the overlap between the region of interest corresponding to the first indexed image and the region of interest corresponding to the next remaining indexed image in the list of recognition results satisfies the threshold; and
including the next remaining indexed image in the candidate list of indexed images.

6. The computer-implemented method of claim 1, wherein the region of interest for the object is a polygon denoting a boundary of the object in the query image.

7. The computer-implemented method of claim 1, further comprising:
providing the candidate list of indexed images for display to a user.

8. A system comprising:
one or more processors; and
a memory storing instructions, which when executed cause the one or more processors to:
receive a query image including an object;
receive a plurality of indexed images that match the object;
compute a region of interest for the object;
compute an overlap between a first region of interest corresponding to a first indexed image and a second region of interest corresponding to a second indexed image;
determine that the overlap between the first region of interest and the second region of interest satisfies a threshold; and
include the first indexed image and the second indexed image in a candidate list of indexed images.

9. The system of claim 8, wherein the instructions cause the one or more processors to:
compute an area match for each of the plurality of indexed images; and
sort the plurality of indexed images to generate a list of recognition results based on the area match.

10. The system of claim 9, wherein the list of recognition results includes the first indexed image and the second indexed image.

11. The system of claim 9, wherein the area match for an indexed image is a ratio of a convex hull of matching inlier points included in the indexed image and a corresponding region of interest.

12. The system of claim 9, wherein the instructions cause the one or more processors to:
compute an overlap between the region of interest corresponding to the first indexed image and a region of interest corresponding to a next remaining indexed image in the list of recognition results;
determine that the overlap between the region of interest corresponding to the first indexed image and the region of interest corresponding to the next remaining indexed image in the list of recognition results satisfies the threshold; and
include the next remaining indexed image in the candidate list of indexed images.

13. The system of claim 8, wherein the region of interest for the object is a polygon denoting a boundary of the object in the query image.

14. The system of claim 8, wherein the instructions cause the one or more processors to:
provide the candidate list of indexed images for display to a user.

15. A non-transitory computer-readable medium storing instructions which, when executed by one or more processors, causes the one or more processors to:
receive a query image including an object;
receive a plurality of indexed images that match the object;
compute a region of interest for the object;
compute an overlap between a first region of interest corresponding to a first indexed image and a second region of interest corresponding to a second indexed image;
determine that the overlap between the first region of interest and the second region of interest satisfies a threshold; and
include the first indexed image and the second indexed image in a candidate list of indexed images.

16. The non-transitory computer-readable medium of claim 15, wherein the instructions cause the one or more processors to:
compute an area match for each of the plurality of indexed images; and
sort the plurality of indexed images to generate a list of recognition results based on the area match.

17. The non-transitory computer-readable medium of claim 16, wherein the list of recognition results includes the first indexed image and the second indexed image.

18. The non-transitory computer-readable medium of claim 16, wherein the area match for an indexed image is a ratio of a convex hull of matching inlier points included in the indexed image and a corresponding region of interest.

19. The non-transitory computer-readable medium of claim 16, wherein the instructions cause the one or more processors to:
compute an overlap between the region of interest corresponding to the first indexed image and a region of interest corresponding to a next remaining indexed image in the list of recognition results;
determine that the overlap between the region of interest corresponding to the first indexed image and the region of interest corresponding to the next remaining indexed image in the list of recognition results satisfies the threshold; and
include the next remaining indexed image in the candidate list of indexed images.

20. The non-transitory computer-readable medium of claim 15, wherein the region of interest for the object is a polygon denoting a boundary of the object in the query image.

* * * * *